United States Patent [19]

Shinoda et al.

[11] Patent Number: 5,064,257

[45] Date of Patent: Nov. 12, 1991

[54] OPTICAL HETERODYNE SCANNING TYPE HOLOGRAPHY DEVICE

[75] Inventors: Kazunori Shinoda, Hamamatsu, Japan; Ming H. Wu, Woodbridge, N.J.; Yoshiji Suzuki, Inasa, Japan; Ting-Chung Poon, 515 Cranwell Cir., Blacksburg, Va. 24060

[73] Assignees: Hamamatsu Photonics K.K., Japan; Ting-Chung Poon, Blacksburg, Va.

[21] Appl. No.: 505,605

[22] Filed: Apr. 6, 1990

[51] Int. Cl.$^5$ .......................... G03H 1/10; G03H 1/14
[52] U.S. Cl. .................................. 350/3.67; 350/3.68; 356/347; 356/349
[58] Field of Search ..................... 350/3.67, 3.68, 3.81, 350/3.82; 356/347, 349

[56] References Cited

U.S. PATENT DOCUMENTS

| | | | |
|---|---|---|---|
| 3,492,652 | 1/1970 | Van Heerden | 350/3.67 |
| 3,633,407 | 1/1972 | Whitman | 350/3.67 |
| 3,636,249 | 1/1972 | Larsen | 350/3.67 |
| 3,665,097 | 5/1972 | Macovski | 350/3.67 |
| 3,762,215 | 10/1973 | Aleksoff | 350/3.67 |
| 3,786,180 | 1/1974 | Macovski | 350/3.67 |
| 3,848,096 | 11/1974 | Marko | 350/3.68 |
| 3,856,986 | 12/1974 | Macovski | 356/347 |
| 4,277,127 | 7/1981 | Smith et al. | 350/3.67 |

OTHER PUBLICATIONS

T. C. Poon, "Scanning Holography and Two-Dimensional Image Processing by Acousto-Optic Two-Pupil Synthesis," *Journal of the Optical Society of America*, vol. 2, p. 521, Apr. 1985.
Poon et al, "Real-Time Optical Holography Using a Spatial Light Modulator," *Japanese Journal of Applied Physics*, vol. 29, No. 10, Oct. 1990, pp. L1840 to L1842.

*Primary Examiner*—Rodney B. Bovernick
*Assistant Examiner*—Martin Lerner
*Attorney, Agent, or Firm*—Oliff & Berridge

[57] ABSTRACT

There is disclosed an optical heterodyne scanning holography device capable of recording and reconstructing a holographic image of an object in real time by optical heterodyne-scanning the object, capturing a scattered wave from the object by a photodetector, and converting a heterodyne output current from the photodetector to a spatial light modulator for coherent processing optically.

5 Claims, 1 Drawing Sheet 5,064,257

OPTICAL HETERODYNE SCANNING TYPE HOLOGRAPHY DEVICE

BACKGROUND OF THE INVENTION

1. Field of the Invention

The present invention relates to an optical heterodyne scanning holography device capable of constructing an optical hologram in real time.

2. Description of the Prior Art

There is known conventionally, means to store phase and amplitude information concerning a reflected wave from an object to be holographed, one means being disclosed for example in Journal of the Optical Society of America A, Vol. 2, page 521, April 1985. In this prior method, laser lights each composed of a plane wave and a spherical wave both slightly different in temporal frequencies are superimposed to construct a Fresnel zone plate with which an object surface to be holographed is then scanned. A light scattered from the object surface, which includes a piece of information concerning the intensity and phase of the light scattered from the object surface is captured by a photodetector, photoelectrically converted, and reconstructed as an image of the object to be photographed on a target of a storage tube in synchronism with the scanning. The image of the object to be photographed is a hologram which is in turn irradiated with a flat laser light to reconstruct a hologram image.

The prior hologram reconstruction technique however has a difficulty in that real time reconstruction is impossible because the hologram must once be converted to a photographic film.

Therefore, reconstruction of a television transmission hologram is substantially impossible.

SUMMARY OF THE INVENTION

In view of the drawbacks of the prior art, it is an object of the present invention to provide an optical heterodyne scanning holography device capable of reconstructing a hologram in real time.

To achieve the above object, an optical heterodyne scanning type holography device according to the present invention comprises a light source for emitting an optical beam, a frequency shifter for converting the optical beam to two different optical beams each different in frequencies temporarily, an interferometer for superimposing those optical beams, one as a spherical wave and the other as a plane wave, a scanner for scanning an object with said superimposed optical beam, a photodetector for capturing a scattered wave of said optical beam scattered from the object, and a spatial optical modulator for coherently converting a signal from the photodetector.

In one aspect of the present invention, said spatial optical modulator is available as an electron beam addressed spatial light modulator.

In another aspect, said spatial light modulator includes deflector means for deflecting electrons in synchronism with said scanner.

In a further aspect, there is provided a controller for homodyning an output current from said photodetector.

In still a further aspect, said interferometer is available as a Mach-Zehnder interferometer.

The above and other objects, features and advantages of the present invention will become more apparent from the following description when taken in conjunction with the accompanying drawing in which a preferred embodiment of the present invention is shown by way of illustrative example.

DESCRIPTION OF THE PREFERRED EMBODIMENT

Figure 1:
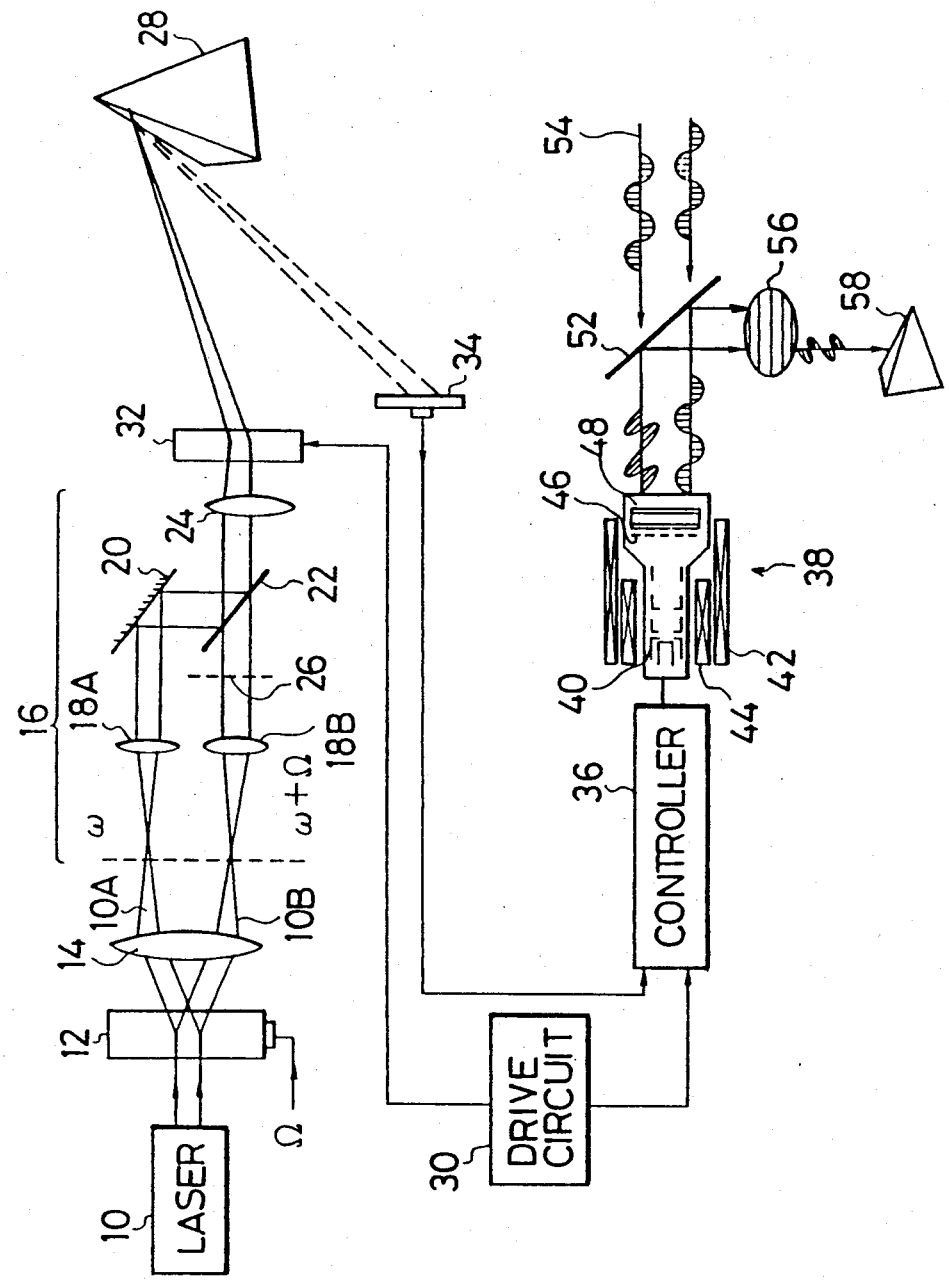
FIG. 1 is a block diagram illustrating an embodiment of an optical heterodyne scanning holography device according to the present invention.

In what follows, the present invention will be described with reference to the accompanying drawing.

As illustrated in FIG. 1, a laser beam of a frequency $\omega$ emitted from a laser 10 is modulated into two laser beams 10A, 10B of frequencies $\omega$ and $\omega + \Omega$ through an acousto-optic light modulator 12. The resulting two laser beams 10A, 10B are fed to a Mach-Zehnder interferometer 16 through a condenser lens 14.

The acousto-optic light modulator 12 is located on a front focal plane of the condenser lens 14.

The Mach-Zehnder interferometer 16 includes a pair of collimator lenses 18A, 18B, a mirror 20 for reflecting a laser beam 10A collimated by the collimator lens 18A in a direction normal to an optical axis of the collimator lens 18A, a half mirror 22 located at an intersecting point between optical axes of the laser beam 10B propagating directly through the collimator lens 18B and of the laser beam 10A reflected on the mirror 20 and slanted 45° with respect to the respective optical axes, and a lens 24 for focusing a laser beam formed by superimposition of the two laser beams through the half mirror 22.

A pinhole aperture 26 is disposed on the front focal plane of the lens 24 in an arm of the Mach-Zehnder interferometer 16 on the side of the collimator lens 18B.

Plane and spherical waves formed by an arm of the Mach-Zehnder interferometer 16 on the side of the collimator lens 18A and on the side of the collimator lens 18B create a Fresnel zone plate on an object 28 to be holographed (hereinafter referred to as an object) through the lens 24.

An X - Y scanner 32 operated by a drive circuit 30 is disposed just behind the lens 24, and the Fresnel zone plate scans the object 28 therewith through the X - Y scanner 32.

Reflected and scattered waves of the laser beams with which the object 28 is scanned are captured by a photodetector 34.

The photodetector 34 detects the scattered lights and photoelectrically converts them to yield a heterodyne current.

The signals modulated by frequencies $\omega$ and $\omega + \Omega$ provide an intensity signal modulated by a difference signal $\Omega$: $I(X, Y, t) \delta A(X, Y) \cos[\pi/\lambda Z \cdot (X^2 + Y^2) + \Omega t]$.

Herein, the origin of depth the coordinates, i.e., z is assumed to be at a rear focal point of the lens 24.

In the above expression, $A(x, y)$ is a reflection coefficient at a point $(x, y)$ on the object 28, and $\cos[\pi/\lambda Z \cdot (X^2 + Y^2)]$ includes information concerning Z, i.e., that in a direction of the depth of the object.

In order to derive the amplitude and phase of the heterodyne current including such information, the current is homodyned.

To be concrete, the output heterodyne current from the photodetector 34 is fed to a controller 36, to which a current local oscillation signal having the difference frequency $\Omega$ between the frequencies $\omega$ and $\omega+\Omega$ of the laser lights 10A, 10B is added and from which the difference frequency $\Omega$ is eliminated through a low pass filter to provide, as an output, $I(X, Y, t) \approx A(X, Y) \cos[\pi/\lambda Z \cdot (X^2 + Y^2)]$.

The output current of the controller 36 is then fed to an incoherent/coherent converter, e.g., an electron beam addressed spatial light modulator (EBSLM) 38.

The EBSLM 38 includes an electron gun 40, a focusing coil 42, a deflection coil 44, a mesh electrode 46, and an electrooptic crystal (e.g., $LiNbO_3$ or DKDP crystal) 48.

The electric signal which has entered the electron gun 40 of the EBSLM 38 through the controller 36 is converted there to an electron beam.

The electron beam emitted from the electron gun 40 is focused by the focusing coil 42 and at the same time allowed to scan the electrooptic crystal 48 by the deflection coil 44 in synchronism with the X - Y scanner 32.

A holographic pattern is formed on the electrooptic crystal 48 by electric charges by the scanning of the electron beam on the electrooptic crystal 48. Once an electric field is formed according to the electric charges, there is caused a change in a refractive index in the electrooptic crystal 48 owing to Pockels effect. The electrooptic crystal 48 which has been changed in the refractive index is irradiated with a read laser light 54 that has been linearly polarized through the half mirror 52.

A reflected wave of the read laser light 54 reflected on the electrooptic crystal 48 is changed to an elliptically polarized wave according to the change in the refractive index of the electrooptic crystal 48 and reflected by the half mirror 52 and further transmitted through an analyzer 56 to form a holographic image 58.

Thus, a real time holographic image is formed.

Conventionally, in general holographic technology, there is a problem to transduce the holographic information into a relatively narrowband electrical signal by means of TV that has a limited spatial resolution. To achieve such a requirement, a wideband television transmission system is necessary if a holographic signal is transmitted as a television signal for example.

According to such an optical heterodyne scanning holography device as described in the present embodiment, a transmission band for a holographic signal can be made narrow, thereby alleviating the transducer problem.

Therefore, there is required no high resolution film as conventional means to reconstruct a holographic image. Additionally, an optical heterodyne scanning holography device according to the present invention assures a television transmission hologram effectively.

Although in the above embodiment the EBSLM 38 was employed, there may be available according to the present invention any spatial light modulator (SLM) which serves to coherently convert a signal from the photodetector without limitation to the above case.

Additionally, the device to convert the same optical beam into two optical beams may include any frequency shifter without limitation to the acousto-optic modulator 12. Therefore, there may be available any electrooptic modulator or magnetooptic modulator.

Although a certain preferred embodiment has been shown and described, it should be understood that many changes and modifications may be made therein without departing from the scope of the appended claims.

What is claimed is:

1. An optical heterodyne scanning holography device comprising:
    a light source for emitting an optical beam;
    a frequency shifter for converting the optical beam to two optical beams each having temporally different frequencies;
    an interferometer for superimposing one of the two optical beams as a spherical wave and the other as a plane wave;
    a scanner for scanning an object with the superimposed optical beams;
    a photodetector for capturing scattered waves of the optical beams from the object; and
    a spatial light modulator for coherently converting a signal from the photodetector.

2. An optical heterodyne scanning holography device according to claim 1 wherein said spatial light modulator is an electron beam addressed spatial light modulator.

3. An optical heterodyne scanning holography device according to claim 1 wherein said spatial light modulator includes deflection means for deflecting electrons in synchronism with said scanner.

4. An optical heterodyne scanning holography device according to claim 1, further comprising: a controller between said photodetector and said spatial light modulator for homodyning an output current from said photodetector, said homodyning including amplitude and phase modulation of said output current from said photodetector by a difference frequency between the frequencies of said two optical beams.

5. An optical heterodyne scanning holography device according to claim 1 wherein said interferometer is a Mach-Zehnder interferometer.

* * * * *